Aug. 16, 1932.    F. E. L. TRIMBACH ET AL    1,871,481
WEDGE
Filed April 11, 1929    4 Sheets-Sheet 1
Fig.1
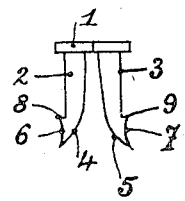
Fig.2
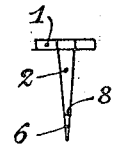
Fig.3
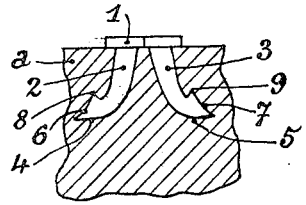
Fig.4
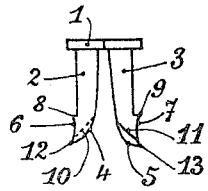
Fig.5
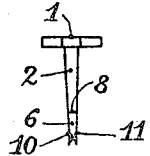
Fig.8
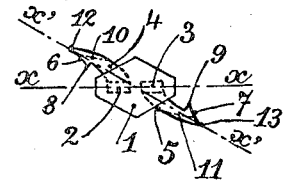
Fig.6
Fig.7
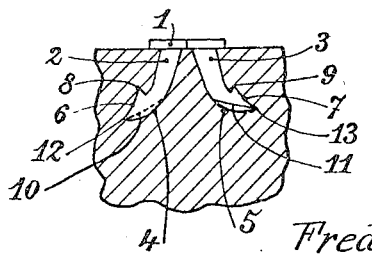
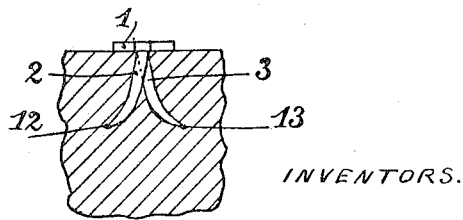
INVENTORS.
Frederic E. L. Trimbach,
Paul Robin and Georg Steinmetz.
By William C. Linton
Attorney.

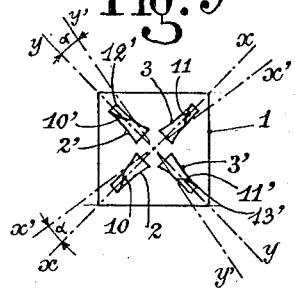
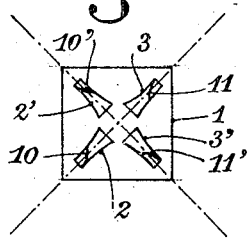
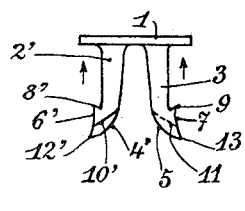
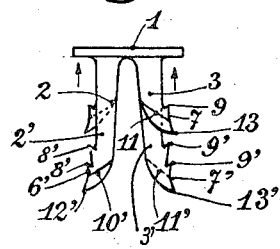
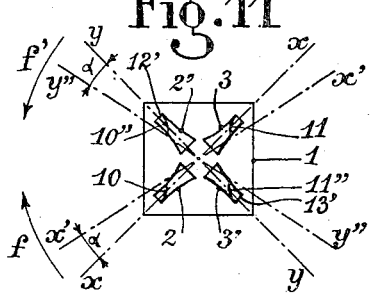
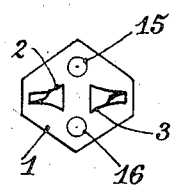
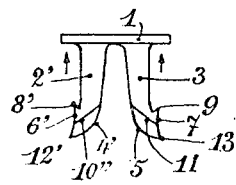

Aug. 16, 1932.  F. E. L. TRIMBACH ET AL  1,871,481
WEDGE
Filed April 11, 1929  4 Sheets-Sheet 3

INVENTORS.
Paul Robin,
Georg Steinmetz,
Fredric E. L. Trimbach.
By William C. Sniton
Attorney.

Aug. 16, 1932.　　F. E. L. TRIMBACH ET AL　　1,871,481
WEDGE
Filed April 11, 1929　　4 Sheets-Sheet 4

INVENTORS
Frederic E. L. Trimbach
Paul Robin
Georg Steinmetz
By William C. Linton
Attorney.

Patented Aug. 16, 1932

1,871,481

UNITED STATES PATENT OFFICE

FREDERIC EMILE LOUIS TRIMBACH, OF LUNEVILLE, AND PAUL ROBIN, OF PARIS, FRANCE, AND GEORG STEINMETZ, OF PFUNGSTADT, GERMANY; SAID ROBIN ASSIGNOR TO SAID TRIMBACH AND SAID STEINMETZ

WEDGE

Application filed April 11, 1929, Serial No. 354,408, and in France February 26, 1929.

Metallic wedges are already known which comprise a top part or head also prongs which are situated in a common plane, said prongs being adapted to be bent, and their ends are terminated by bevels placed in opposite directions. The said wedges can be driven into various devices, such as tools, handles or the like, and when they are driven in, the bevelled prongs will bend in opposite directions, thus preventing any improper release of the wedge.

The present invention relates to a wedge of this class comprising a head and also prongs which will bend in contrary directions, but herein the wedging action will more firmly secure the wedge in the material into which it is driven.

According to the present invention, the said wedge may comprise one or more of the following dispositions.

(a) The prongs of the wedge are curved before being driven into the material upon a substantial part of their length, and in opposite directions.

(b) Each prong may be provided with one or more claws which prevent all release of the wedge.

(c) Each prong may also have a bevelled part, and the bevels of the two opposite prongs may have contrary directions.

(d) Such wedges may comprise $n$ pairs of prongs, $n$ being any integer.

(e) In the case in which $n$ is greater than 1, the $n$ pairs of prongs may be situated in radial planes, which planes are preferably spaced at equal angular distances.

(f) In this same case in which $n$ is greater than 1, the $n$ pairs of prongs may have different sizes.

(g) Certain pairs of prongs may have some of the aforesaid features, and other pairs of prongs, other features.

(h) The head of the wedge may carry permanent pointed projections which are to be driven in without bending.

(i) The said permanent projections may be provided with claws.

The aforesaid arrangements will offer the following advantages:

(1) The preliminary bent prong will offer a retaining action which is much stronger than what is obtained by the known wedges.

(2) The claws which may be provided on each prong will also reinforce the anchoring of the prongs in the material.

(3) The oppositely-disposed bevels optionally provided on the prongs of the wedge will cause lateral bending which holds the wedge more firmly.

(4) The use of $n$ pairs of prongs on the same wedge permits to multiply by $n$ the wedging effect of the device.

(5) The radial disposition of the pairs of prongs permits to obtain an apparatus having a radial action.

(6) The use of a wedge with $n$ pairs of prongs having different dimensions will permit to obtain different effects in the respective planes of these prongs.

(7) The use of pairs of prongs having different forms permits to increase the diversity of such effects.

(8) The combination in a given wedge, of pointed driving projections of permanent shape, facilitates the driving, and also the holding of the wedge in the material.

(9) The use of anchoring claws on such points further increases the aforesaid advantage.

For these different reasons, the force due to the insertion and the anchoring of the wedges according to the invention will be much greater than what can be obtained with the known devices, and hence all tools and apparatus fitted with the said wedges will be attended with advantages which do not appear in the usual apparatus of this class.

Due to the different advantages of the wedges herein described, the present invention is susceptible of applications of a more varied nature than can be obtained by the known wedges.

Among such applications may be mentioned spikes or wedges the heads of which are provided with lateral projections adapted to secure various objects between the said projections and the material into which the wedge is inserted and chiefly spikes for securing railroad rails to wood ties. Spikes of this class may comprise the whole or a part of the aforesaid dispositions and will assure the perfect securing of all suitable objects to their supports and chiefly of rails to their ties. Such spikes offer many advantages over screw spikes. For these reasons, the present invention relates to such spikes in a particular manner, and chiefly to spikes for securing railroad rails to their ties.

The accompanying diagrammatic drawings show by way of example various embodiments of the invention which are not of a limitative nature.

Figure 1 is a front elevation of a wedge according to the invention.

Figure 2 is the corresponding side view.

Figure 3 is a sectional view showing the wedge driven into the material, and indicating the bending of the prongs.

Figure 4 is an elevational view showing a wedge, resembling the one indicated in Fig. 1, which is further provided with a bevel on each prong, the two bevels having contrary directions.

Figure 5 is the corresponding side view.

Figure 6 is a front view with the wedge of Fig. 4 when inserted.

Figure 7 is a side view of the same wedge when inserted.

Figure 8 is a plan view of a bent wedge in conformity to Figs. 4 to 7, the wedge being removed from the material into which it was inserted in order to show the bending of the prongs.

Figure 9 is a bottom plan view (according to the arrows of Fig. 10) of a wedge comprising two pairs of bending prongs, these pairs being in the radial position and having the same features and the same size.

Figure 10 is an elevational view of the wedge shown in Fig. 9.

Figures 11 and 12 show a modification of Figures 9 and 10.

Figure 13 is a bottom plan view (according to the arrows of Figure 14) of a wedge having two pairs of bending prongs, which pairs are radial but have different sizes, differing also in other features.

Figure 14 is an elevational view of the wedge shown in Figure 11.

Figure 15 is a bottom plan view (according to the arrows of Figure 16) of a wedge having one pair of bending prongs and also one pair of bending permanent pointed projections.

Figure 16 is a corresponding elevational view.

Figure 17 is an elevational view of a wedge comprising several of the aforesaid dispositions and constructed in the form of a spike for railroad rails, the said spike being supposed to be driven into the railroad tie; the dotted lines show the form of the spike before it is driven in.

In these different figures, like notation corresponds to similar parts.

Figure 17:
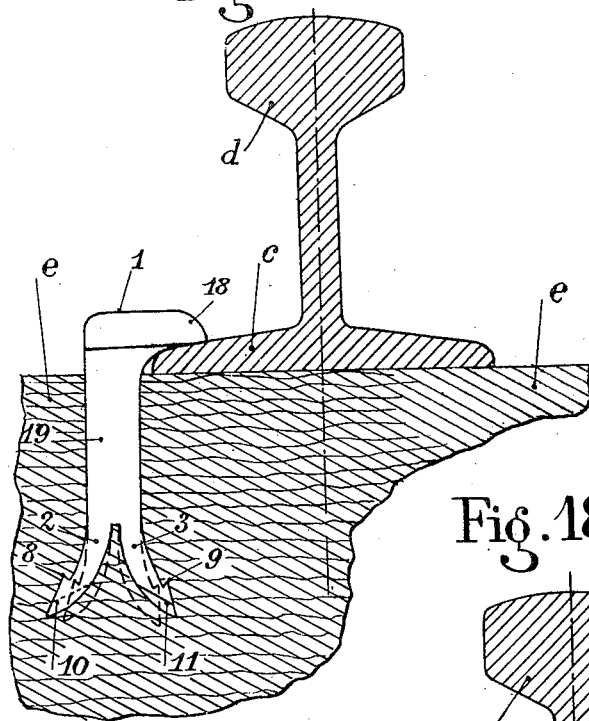

In Figs. 1 to 3, 1 is the top of the wedge, whose outline may have in plan view any suitable form, polygonal or the like; 2 and 3 are its prongs which comprise the respective curved parts 4—5 having contrary directions and situated in the same plane.

The outer parts 6—7 of the said prongs carry the respective claws 8 and 9.

The device being thus disposed, when the wedge is driven into material such as wood or the like, the curved parts 4 and 8 will be disposed as shown in Fig. 3, and the claws 8—9 reinforce the anchoring of the said bent parts in the said material.

In Figures 4 to 8, the prongs 2 and 3, which resemble those of these preceding devices are also bevelled at 10 and 11 in opposite directions, and, thus when the prongs are driven into the material, the bending of the prongs takes place in the plane of the prongs and also at right angles to the latter. Therefore, the pointed ends 12—13 of the prongs will be finally displaced according to a diagonal (Fig. 8), on a line $x'\ x'$ which is oblique to the original line $x\ x$ upon which the said points were situated before being driven in, thus increasing the bending action and offering greater safety.

In Figs. 9 and 10, the top 1 of the wedge carries two pairs of bending prongs 2—3 and 2'—3', each pair being situated in a separate plane $x\ x$ and $y\ y$ passing through the centre of the top part 1. The pairs of prongs might be disposed in any other manner, and for instance in the parallel position. 6' and 7' are the sides of the prongs of second pair; 8' and 9' are the claws; 10' and 11' the parts bevelled in opposite directions on the said prongs 12'—13' their points.

In these Figures 9 and 10, the bevels of the prongs will have practically the same situation, as is shown by examining the several prongs 2—2' and 3—3', and thus after the wedge is driven in, the points of the pair of prongs 2—3 will have been moved from the line $x$—$x$ to the line $x'$—$x'$, and the points of the pair 2'—3' from the line $y\ y$ to the line $y'\ y'$. In this manner, the lines $x\ x$ and $y\ y$ will have turned in the same direction and through the same angle $\alpha$.

In Figures 11 and 12, the wedge which is represented differs from those of Figures 9 and 10 only by the fact that the bevels 10'' and 11'' of the respective prongs 2' and 3' have a different direction from that of the bevels 10 and 11 of Figures 9 and 10. The said bevels 10″ and 11″ are opposite the bevels 10 and 11 of the prongs 2 and 3, respectively.

In this manner, the ends 12′ and 13′ of these prongs 2′ and 3′, after the wedge is driven in, will be situated on a line $y'' y''$ making with the initial line $y y$ an angle—$\alpha$ in the direction of the arrow $f'$ which is opposite to the direction of the arrow $f$ of the angularly displacement $\alpha$ of the ends 12 and 13. This affords a particular wedging effect in the material.

In Figs. 13 and 14, the two pairs of prongs 2—3 and 2′—3′ have unequal lengths. The prongs 2′ and 3′ are longer and thinner than the prongs 2 and 3 and each of these prongs carries two claws instead of one, that is 8—8′ for the prong 2′, and 9′—9′ for the prong 3′. These differences in the dimensions and characteristics of the two pairs of prongs will cause differences in the method of action of the same.

In Figs. 15 and 16, the wedge comprises a pair of bending prongs 2 and 3, but it might comprise a greater number, and the wedge is also provided with the rigid points 15, 16 which are longer than the prongs 2 and 3, in such manner that the points 15, 16 are already engaged in the material when the prongs 2 and 3 are inserted.

Further, the said points may be provided with claws at 17.

Figure 17 shows a spike for railroad rails, and it herein comprises a head 1 provided with a lateral projection 18, a main body 19 for securing the flange $c'$ of the rail $d$, which has a suitable length and is terminated at the exterior by two branches 2—3 whereof one has a bent shape and the other is adapted to bend, said branches being respectively provided with the claws 8—9 and the bevels 10—11. Herein the said spike is driven into a tie $e$, and the said projection 18 holds the flange $c$ of the rail $d$.

Figure 18:
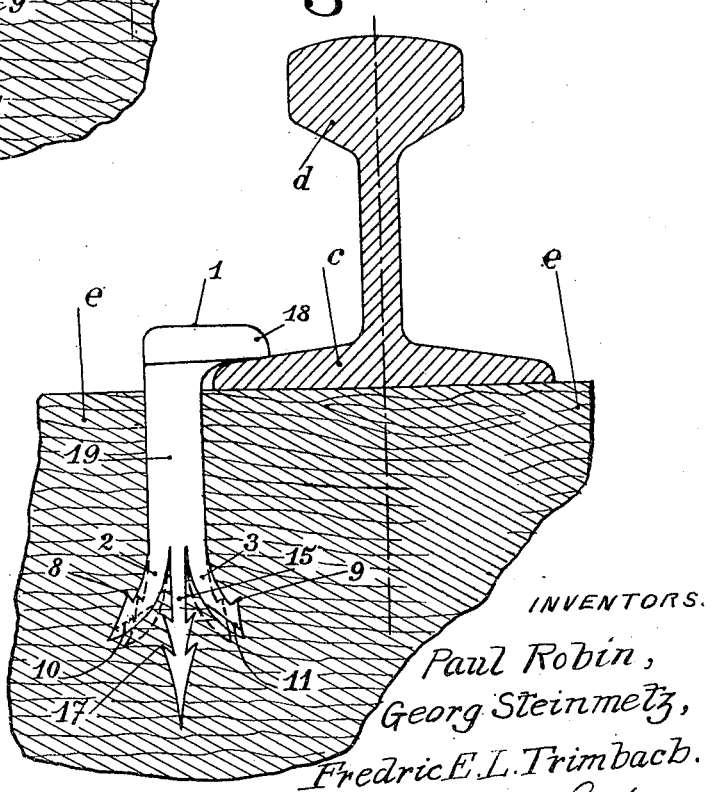
Figure 18 is an elevational view of a modification of the last mentioned spike.

Figure 18 shows a spike resembling the one shown in Fig. 17, it being provided with a projection point 15 having the claws 17.

Figure 19:
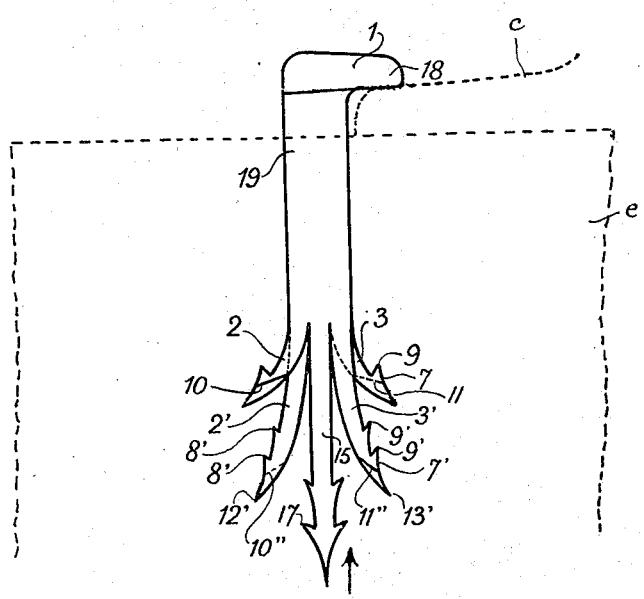
Figure 19 is an elevational view of another modification of the spike shown in Fig. 17, the railroad tie into which the same wedge is to be driven being shown partially and in dotted lines.
Figure 20:
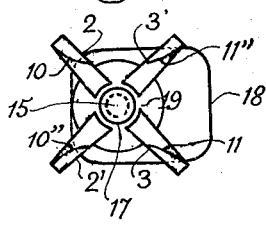
Figure 20 is a bottom plan view (according to the arrow of Fig. 19) of the spike of the said figure.

Figures 19 and 20 show a similar spike provided with two pairs of prongs 2, 3 and 2′, 3′ having unequal lengths; the bevels 10″ and 11″ of the respective prongs 2′ and 3′ have a different direction from that of the bevels 10 and 11 of the prongs 2 and 3, the arrangement of these bevels being similar to that shown in Figures 11 and 12, the said bevels 10″ and 11″ being opposite the bevels 10 and 11 of the prongs 2 and 3, respectively and as indicated with reference to the wedge shown in Figures 11 and 12, this affords a particular wedging effect in the material of the tie or other article into which the wedge is driven.

Having now particularly described and ascertained the nature of our said invention and in what manner the same is to be performed, we declare that what we claim is:

A wedge comprising several pairs of co-operating prongs, the prongs of each pair being curved in opposite directions in the same plane for forcing the prongs of each pair in diametrically opposed directions when driven into the material, beveled portions arranged on the prongs of each pair in opposite directions, said beveled portions being themselves situated in opposite directions and in planes disposed outside of the original planes of said prongs, and being subjected to being bent in opposite directions when driven into said material, whereby with the forcing of the prongs in diametrically opposed directions to simultaneously drive the ends of said prongs along a diagonal outside of the original plane of the prongs.

In witness whereof we have hereunto set our hands.

FREDERIC EMILE LOUIS TRIMBACH.
PAUL ROBIN.
GEORG STEINMETZ.